United States Patent
Van Druten et al.

(10) Patent No.: US 8,702,547 B2
(45) Date of Patent: Apr. 22, 2014

(54) FLYWHEEL MODULE AS WELL AS METHOD FOR ENERGY STORAGE AND DELIVERY IN THE FLY-WHEEL MODULE

(75) Inventors: Roell Marie Van Druten, Eindhoven (NL); Bas Gerard Vroemen, Eindhoven (NL); Alexander Franciscus Anita Serrarens, Wallre (NL)

(73) Assignee: Drivetrain Innovations, B.V., Eindhoven (NL)

( * ) Notice: Subject to any disclaimer, the term of this patent is extended or adjusted under 35 U.S.C. 154(b) by 251 days.

(21) Appl. No.: 13/125,098

(22) PCT Filed: Oct. 21, 2009

(86) PCT No.: PCT/NL2009/050636
§ 371 (c)(1),
(2), (4) Date: Jul. 20, 2011

(87) PCT Pub. No.: WO2010/059041
PCT Pub. Date: May 27, 2010

(65) Prior Publication Data
US 2011/0271790 A1 Nov. 10, 2011

(30) Foreign Application Priority Data
Oct. 21, 2008 (NL) ..................................... 2002122

(51) Int. Cl.
*F16H 47/12* (2006.01)
(52) U.S. Cl.
USPC ................ 475/111; 475/5; 475/151; 475/267

(58) Field of Classification Search
USPC ............. 475/1, 5, 8, 149, 151, 111, 267, 211, 475/207, 210, 218, 302
See application file for complete search history.

(56) References Cited

U.S. PATENT DOCUMENTS

| 7,410,436 B2* | 8/2008 | Van Druten et al. .............. 475/5 |
| 7,967,714 B2* | 6/2011 | Van Druten et al. .......... 475/211 |
| 8,398,515 B2* | 3/2013 | Sartre et al. ....................... 475/6 |
| 2007/0049443 A1 | 3/2007 | Schmidt |
| 2008/0282824 A1* | 11/2008 | Van Druten et al. ......... 74/411.5 |

FOREIGN PATENT DOCUMENTS

| NL | 1 022 092 | 6/2003 |
| WO | WO2006/043812 | 4/2006 |
| WO | WO 2006043812 A2 * | 4/2006 |
| WO | WO2009/010819 | 1/2009 |

* cited by examiner

*Primary Examiner* — Justin Holmes
(74) *Attorney, Agent, or Firm* — Eric Karich

(57) ABSTRACT

A flywheel module has a flywheel as well as a speed transforming device which has a first in/output which is connected to the flywheel, and a second in/output which is coupled to a drive line of a vehicle. The speed transforming device has a bypass speed transforming device and a motor and/or generator. Energy can then be exchanged with the flywheel by suitably controlling the motor and/or generator. As a result of the delivery of a negative torque by the motor and/or generator, the flywheel accelerates and because of the delivery of a positive torque by the motor and/or generator the flywheel decelerates.

11 Claims, 3 Drawing Sheets

FLYWHEEL MODULE AS WELL AS METHOD FOR ENERGY STORAGE AND DELIVERY IN THE FLY-WHEEL MODULE

FIELD OF THE INVENTION

The invention relates to a flywheel module comprising a flywheel, as well as a speed transforming device having a first in/output which is connected to the flywheel and a second in/output which can be coupled to a drive line of a vehicle positioned between a drive source and driven wheels, and/or to one or more of the driven wheels or further wheels of the vehicle and/or to the drive source of the vehicle, which speed transforming device can provide a continuously variable control of the torque between the first and the second in/output.

STATE OF THE ART

A drive system comprising a flywheel module of this type is known from international patent application having publication number WO-A-2004/000595. In this known drive system the flywheel is coupled to the drive line of a vehicle via a continuously variable transmission (CVT). By controlling the gear ratio of the CVT, energy can be stored in the flywheel or the flywheel can deliver energy to the drive line for brief acceleration of the vehicle.

SUMMARY OF THE INVENTION

It is an object of the invention to provide a flywheel module of the type defined in the opening paragraph which is simpler and hence more cost effective than the flywheel module of the known drive system. For this purpose the flywheel module according to the invention is characterised in that the speed transforming device comprises at least a single motor and/or generator, as well as a bypass speed transforming device having at least three rotational members, a first rotational member of which being connected to the first in/output, a second rotational member of which being connected to the second in/output and the third rotational member of which being connected to the motor and/or generator, where the flywheel module comprises energizing means for the motor and/or generator, as well as a control unit which can control the energizing means, the control unit being in a position to brake or drive the drive line and/or one or more of the driven wheels or further wheels by controlling the energizing means of the motor and/or generator. Since energy is stored in a flywheel in the flywheel construction according to the invention, and can be delivered from a flywheel without utilizing a CVT, a simpler and more cost effective flywheel module is obtained than that in the known drive system.

An embodiment of the flywheel module according to the invention is characterised in that the drive source is connected to the first in/output of the speed transforming device, where the second in/output of the speed transforming device needs to be coupled only to the driven wheels of the vehicle.

For enhancing the functionality of the flywheel module a further embodiment of the flywheel module according to the invention is characterised in that the speed transforming device further includes a clutch which is positioned between one of the in/outputs and the rotational member connected thereto or between two of the rotational members.

The energizing means preferably comprise an energy storage system or a further motor and/or generator which is connected to one of the in/outputs or the drive line or one or more of the further wheels. The energy storage system may be for example a battery or a hydraulic accumulator or an ulta-cap.

For further enhancing the functionality of the flywheel module still a further embodiment of the flywheel module according to the invention is characterised in that the speed transforming device further includes a further clutch which is positioned between the further motor and/or generator and the in/output connected thereto.

The control unit preferably contains power electronics which allow for driving or braking one of the motors and/or generators with the other motor and/or generator. The drive source may then be formed by the further motor and/or generator.

The control unit preferably controls the energizing means only for a brief period of time as a result of which the drive line and/or one or more of the further wheels is/are braked or driven only for a brief period of time. In this way the flywheel module functions merely as an auxiliary drive for briefly additionally accelerating or decelerating the vehicle.

Yet another embodiment of the flywheel module according to the invention is characterised in that the speed transforming device comprises a motor and/or generator as well as a bypass speed transforming device comprising three rotational members, a first rotational member of which being connected to the first in/output, a second rotational member of which being connected to the second in/output and the third rotational member of which being connected to the motor and/or generator. Energy can then be exchanged with the flywheel by suitably controlling the motor and/or generator where because of the delivery of a negative torque by the motor and/or generator to the bypass speed transforming device the flywheel accelerates and because of the delivery of a positive torque by the motor and/or generator to the bypass speed transforming device the flywheel decelerates.

For reducing the power to be produced by the motor and/or generator for causing the flywheel to accelerate or decelerate, the gear ratio of the bypass speed transforming device (diameter of the ring gear divided by the diameter of the sun gear) is chosen such that the change of speed of the flywheel exceeds the change of speed of the motor and/or generator.

For further reducing the power to be produced by the motor and/or generator for causing the flywheel to accelerate or decelerate, the number of revolutions per minute (RPM) of the motor and/or generator is maintained at a minimal level.

For still further reducing the power to be produced by the motor and/or generator for causing the flywheel to accelerate or decelerate, the motor and/or generator is operated in both positive and negative direction of rotation. The absolute RPM of the motor and/or generator can then be halved compared to a control/configuration in which the motor and/or generator is driven with only a positive or only a negative speed.

For reducing even more the power to be produced by the motor and/or generator for causing the flywheel to accelerate or decelerate, the flywheel module is preferably coupled to the output of the transmission in a drive line. For that matter the output RPM of a transmission in a standard vehicle continues to be substantially constant in the first few seconds after a launch of the vehicle has been commenced by the driver. Alternatively, the input RPM of the transmission will rise rapidly during the first few seconds after a launch of the vehicle has been commenced by the driver. At a substantially constant RPM of the output of the flywheel module, a larger change in RPM of the flywheel can be achieved than with an increasing RPM of the output of the flywheel module. In the case of a racing car (formula 1) the flywheel module is preferably coupled to the input shaft of the transmission because the RPM of the input shaft varies less than that of the output shaft.

Reducing the absolute speed at which the motor and/or generator is driven allows for delivering a large power with a small (electric, hydraulic, pneumatic) power to the drive line or withdraw it from the drive line. The flywheel then delivers or withdraws the largest power because it can rotate at a higher RPM than the motor and/or generator and can still continue to support the reaction torque. The costs, the volume and the weight of for example an electric motor and/or generator with attendant power electronics and battery system can be reduced considerably as a result.

For enhancing the functionality of the flywheel module a further embodiment is characterised in that the speed transforming device further includes a mechanical brake which is coupled to the flywheel. This brake may also be a form-closed clutch that need not be capable of slipping. For example, by energizing the brake when the vehicle stands still, the vehicle can be driven in forward or reverse direction by means of the motor and/or generator. If the motor and/or generator is coupled to an energy storage system (battery, capacitor, pressure buffer) it is possible to regain also braking energy in this way. The flywheel module can then also perform the function of a hybrid drive.

If the vehicle is accelerated by the motor and/or generator in this way, the main drive source (combustion engine or electromotor) is to be started after a few seconds. For not loading the starter motor of the combustion engine at too many instances, the combustion engine can also be started via the main clutch which is present in substantially all vehicle drives and is used in a conventional vehicle for launching the vehicle. The size of this main clutch can be reduced in combination with the flywheel module because it merely needs to accelerate the combustion engine, which has a much smaller inertia than the vehicle.

In order not to be troubled too much by the starting of the combustion engine, it is to be preferred to put the transmission in a higher gear than the first gear when the clutch is being closed. The higher the gear, the less the negative start torque is amplified towards the wheels and the more easily this additional torque can be delivered by the flywheel module.

While the flywheel module is still driving the vehicle, after the start of the combustion engine this combustion engine can be further revved up by changing down the gear. The combustion engine can now accelerate the vehicle to maximum extent and the flywheel module is no longer needed for propulsing the vehicle. The flywheel can even be accelerated during the acceleration of the vehicle by having the motor and/or generator deliver a low negative torque. To this end the brake on the flywheel is first to be disengaged.

If a stepped transmission, for example an automatic manual gearbox, is incorporated in the drive line, even the clutch interruption during the switching operation can be absorbed by the flywheel module. During and/or just before the opening of the main clutch the motor and/or generator is to deliver a positive torque for this so that both the motor and/or generator and the flywheel take over the propulsing of the vehicle for a brief period of time. Once the main clutch has been closed, the combustion engine takes over the driving and the motor and/or generator can again slowly "charge" the flywheel.

If after an acceleration of the vehicle a constant speed is desired, the combustion engine can be revved down to a fuel-optimal operation point by switching up the transmission. Even during this switching up the flywheel can be further accelerated by having the motor and/or generator deliver a negative torque. If the main clutch is to be opened for the benefit of the switching operation, the torque to the wheels can still be delivered by means of the flywheel module.

If the vehicle is driven at fuel-optimal consumption at the highest possible gear ratio of the transmission, so at a low RPM of the combustion engine, the flywheel is maintained at a high RPM by operating the motor and/or generator at a low or even negative RPM. If this RPM is close to zero revolutions, even with an additional brake on the motor and/or generator the flywheel can be maintained at the right RPM.

If, subsequently, an acceleration of the vehicle is desired, the flywheel module can assist the drive line by having the motor and/or generator deliver a positive torque. The flywheel then decelerates when this is effected and provides that additional torque is delivered to the wheels.

At the same time the combustion engine can be revved up by changing down the gear to a lower gear ratio. If this is effected rapidly, the combustion engine needs the larger part of its torque for revving up itself. After the combustion engine has been revved up, it can resume the driving of the vehicle by taking over from the flywheel module. In this way it is always possible to drive in an economical way with a low RPM of the combustion engine and the vehicle can be accelerated directly if so desired. There will then no longer be any annoying deceleration in the acceleration.

For regaining brake energy the motor and/or generator will first have to be revved up so as to bring the RPM of the flywheel to zero and the brake on the connection between the bypass speed transforming device and the flywheel can be closed. For effecting this in a fast manner it may be desirable to disengage the flywheel by means of an additional declutch so that the flywheel need not be revved down.

It is alternatively possible to block the bypass speed transforming device by means of a coupling between two rotational members, so that the motor and/or generator can deliver a negative torque to the output so as to regain brake energy.

During the braking action the transmission can be changed down to the desired gear in which then the combustion engine can be started or in which the vehicle can be driven optimally.

For integrating the construction of the flywheel module with an existing drive line in a simple fashion, the flywheel can be positioned concentric to the existing engine flywheel. The coupling between the bypass speed transforming device and the drive line can be effected direct by means of the gear of the end reduction. For getting these gears in a CVT closer to the primary shaft, the intermediate speed transforming device of the end reduction can be shifted so that fewer gears are needed.

Furthermore, it is desired to realise a delaying reduction between the motor and/or generator and the bypass speed transforming device. If the motor and/or generator is positioned parallel to the primary shaft, this speed transformation can be made direct with a simple gearing. The motor and/or generator can be positioned both inside and outside the transmission housing. If it is positioned outside the housing, a cooling can be installed in a simpler manner.

In continuously variable transmissions and automatic transmissions the flywheel module can directly replace the present torque converter clutch because it is no longer needed functionally. The main clutch can be arranged at a smaller size (for less energy dissipation) and be positioned somewhere in between the crankshaft and the differential.

For reducing the flywheel speed, more particularly in sports cars, the flywheel module or the flywheel may be disengaged as desired by means of an additional disengagement action. Another possibility is to realise a connection between the bypass speed transforming device (MG) and the primary shaft of the transmission by means of an additional clutch. This will also allow for extra functions.

Furthermore, it is possible for additional reductions (by-pass speed transforming devices or even transmission devices) to be installed between the elements of the bypass speed transforming device and/or between the bypass speed transforming device and one of the components (MG, flywheel, output) to further optimise the system performance.

The motor and/or generator can be connected to any type of energy storage systems or combinations thereof (battery, capacitance etc.).

The flywheel module can also be connected to the rear wheels, while the main drive is connected to the front wheels and vice versa. As a result, a four-wheel drive vehicle can be realised in a simple manner. Alternatively, it is possible to install the flywheel module in the individual wheels or a plurality of modules can be applied to one vehicle.

The motor and/or generator need not be an electromotor and/or generator, it may also be a hydraulic or pneumatic motor and/or generator, which is coupled to a hydraulic or pneumatic energy buffer.

The flywheel may also be a motor and/or generator having relatively high rotational inertia.

For increasing the functionality of the flywheel module a further embodiment of the invention is characterised in that the speed transforming device further includes a brake which is coupled to the third rotational member.

The invention also relates to a vehicle comprising two pairs of wheels, as well as a transmission and a drive source which is connected to one of the wheel pairs via a drive line with the transmisison being present in the drive line. With respect to the vehicle, the invention is characterised in that the vehicle comprises a flywheel module as claimed in any one of the preceding claims, in which the flywheel module is connected between on the one hand the transmission and on the other hand the drive source or via the wheel pair connected to the transmission is connected to the drive line, and/or in that the flywheel module is connected to the other wheel pair.

One embodiment of the drive is characterised in that the flywheel module is further coupled to the drive line on the other side of the transmission. Preferably, a clutch is positioned on this other side of the transmission, in between the drive line and the flywheel module.

BRIEF DESCRIPTION OF THE DRAWINGS

The invention will be further described below in more detail with reference to embodiments of the invented flywheel module either or not installed in a vehicle drive and represented in the drawing figures, in which.

DETAILED DESCRIPTION OF THE DRAWINGS

Figure 1:
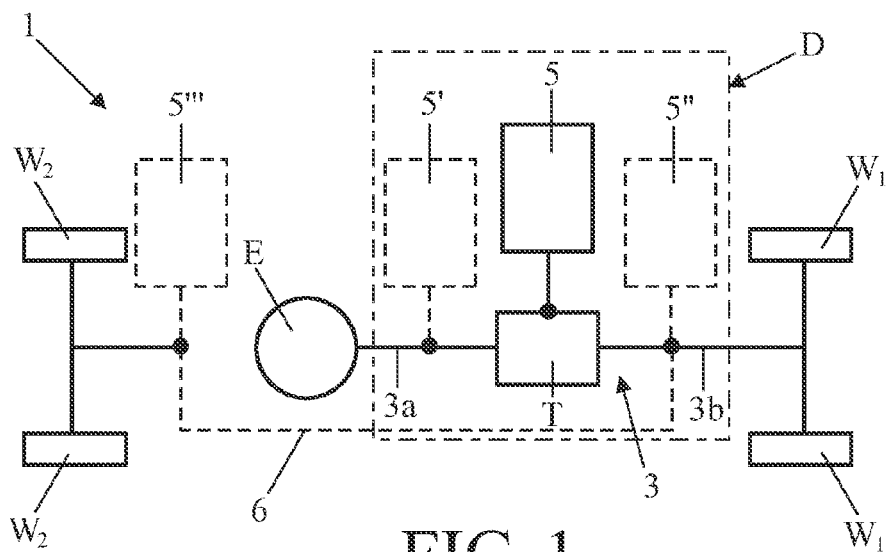
FIG. 1 shows a diagrammatic lay-out of a drive of a vehicle comprising a flywheel module according to the invention.

FIG. 1 shows a diagrammatic lay-out of a vehicle 1 comprising a drive source E which drives wheels $W_1$ via a drive unit D. The drive unit D comprises a drive line 3 which has an input 3*a* and an output 3*b*. The drive line 3 has a transmission T which is positioned between the input 3*a* and the output 3*b*. The drive unit D further comprises a flywheel module 5 which can be connected to the transmission T or can be connected to the drive line 3 on the primary side (flywheel module 5') or the secondary side (flywheel module 5") of the transmission T, or which is connected to one or both further wheels $W_2$ of the vehicle (flywheel module 5'''). In the latter case the flywheel module 5''' can in addition be connected to the drive line 3. This is shown diagrammatically by means of connecting line 6.

FIGS. 2 to 5 show various embodiments of the flywheel module according to the invention. The flywheel modules 5.1 and 5.2 (FIGS. 2 and 3) comprise a flywheel F and a speed transforming device I which has a first in/output $I_1$ which is connected to the flywheel and a second in/output $I_2$ which can be coupled to the drive line 3. In these drawing Figures a planetary gear set is referenced P, a clutch is referenced C, a brake is referenced B, a motor and/or generator is referenced MG, power electronics are referenced PE and a battery is referenced B. Alternative locations for the clutch C or possible additional brakes B are indicated by broken lines.

Figure 2:
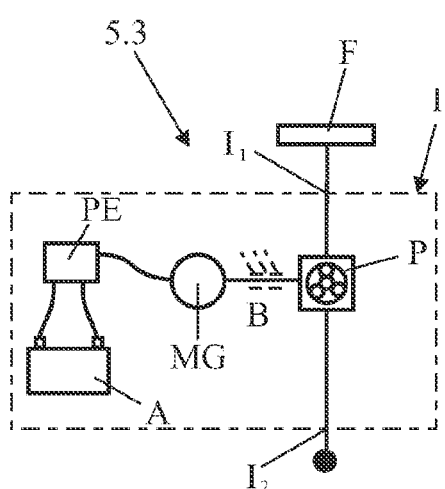
FIGS. 2 and 3 show various embodiments of the flywheel module according to the invention.
Figure 3:
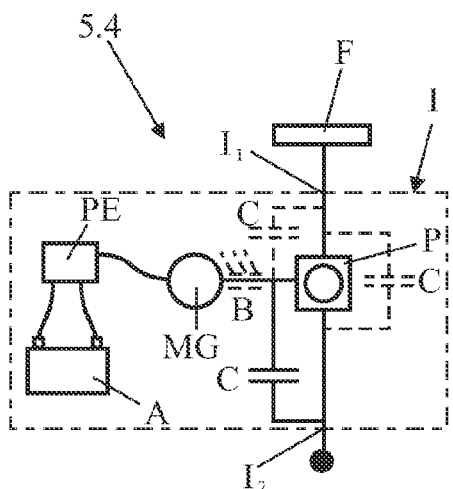
Figure 4:
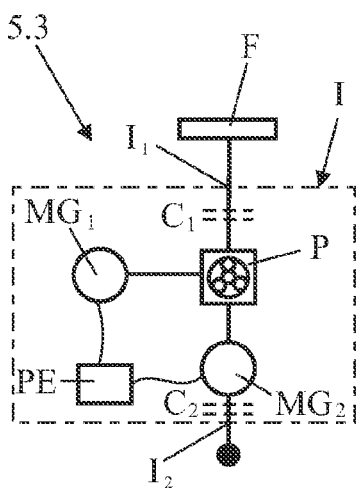
FIGS. 4 and 5 show further embodiments of the flywheel module according to the invention provided with a further motor and/or generator.
Figure 5:
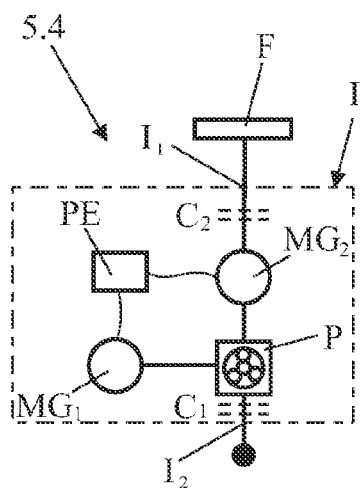

By having the motor and/or generator MG operate as a generator in the flywheel module 5.1 shown in FIG. 2, energy is stored in the battery A and the flywheel F is revved up, whereas by having the motor and/or generator MG operate as a motor, energy is delivered by both the motor and/or generator and the flywheel F.

The flywheel modules 5.3 and 5.4 (FIGS. 4 and 5) comprise in addition to the motor and/or generator $MG_1$ a further motor and/or generator $MG_2$ which is connected to the planetary gear set P. The two motors and/or generators $MG_1$ and $MG_2$ are connected to power electronics PE. In the flywheel mode 5.3 shown in FIG. 4 the further motor and/or generator $MG_2$ is positioned between the planetary gear set P and the second in/output $I_2$, and in the flywheel mode 5.4 shown in FIG. 5 the further motor and/or generator $MG_2$ is positioned between the planetary gear set P and the first in/output $I_1$. In addition to or in lieu of the clutch $C_1$, which is positioned between the planetary gear set P and the in/output $I_1$ or $I_2$ respectively connected thereto, these flywheel modules may comprise a further clutch $C_2$ which is positioned between the further motor and/or generator $MG_2$ and the in/output $I_2$ or $I_1$ respectively connected thereto (see FIG. 4).

Figure 6:
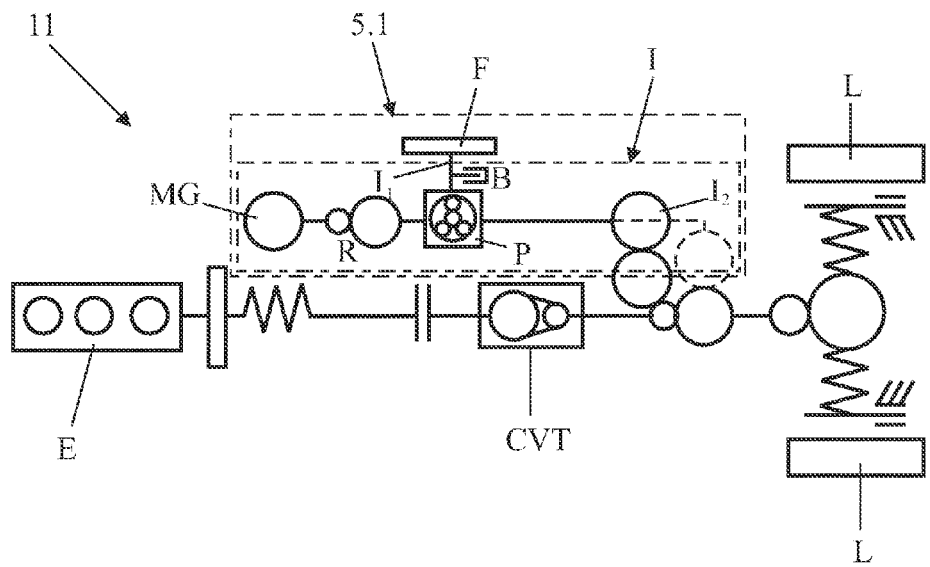
FIG. 6 shows a lay-out of a vehicle comprising CVT and front wheel drive provided with the flywheel module according to the invention.
Figures 7, 8:
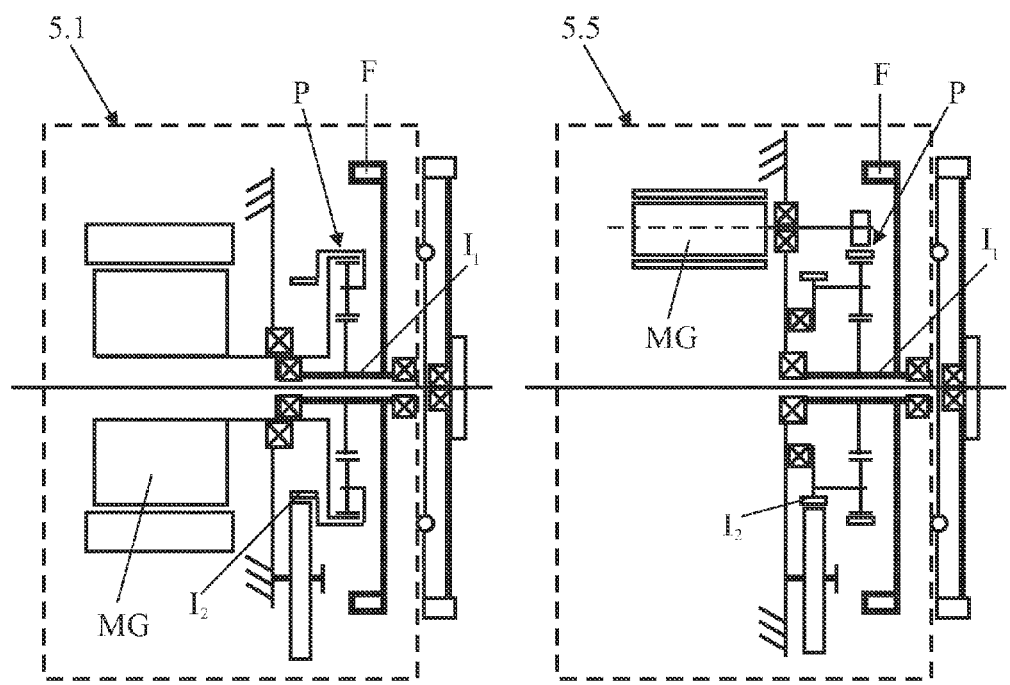
FIG. 7 gives a diagrammatic representation of a construction design of the flywheel module shown in FIG. 6.
FIG. 8 shows a variation of the embodiment shown in FIG. 7.

FIG. 6 shows a lay-out of the vehicle 11 comprising CVT and front wheel drive provided with the embodiment 5.1 of the flywheel module shown, and FIG. 7 gives a diagrammatic representation of a construction design of the flywheel module 5.1 of the vehicle shown in FIG. 6.

The flywheel module 5.1 shown in FIG. 6 comprises a flywheel F as well as a speed transforming device I which has a first in/output $I_1$ which is connected to the flywheel F, and a second in/output $I_2$ which is coupled to a drive line of a vehicle 11. The speed transforming device I comprises a bypass speed transforming device P and a motor and/or generator MG.

Energy can be exchanged by means of the flywheel F by suitably operating the motor and/or generator MG. By delivering a negative torque with the motor and/or generator, the flywheel F will accelerate and by delivering a positive torque with the motor and/or generator, the flywheel F will decelerate For achieving additional functionality a brake B is connected to the first rotational member. Furthermore, between the third rotational member and the motor and/or generator a reduction gear has been positioned, so that the motor and/or generator can be operated at a lower RPM. The second in/output $I_2$ which is formed by a gear can also be coupled to another gear in the drive line. This is indicated by means of broken lines.

FIG. 8 shows a variation of the embodiment shown in FIG. 7. In this flywheel module 5.5 the motor and/or generator MG is not concentric to the flywheel F but in parallel with the primary shaft between the drive source and the transmission. The motor and/or generator can be installed both inside and outside the housing. For realising additional cooling for the motor and/or generator it is suitable to install the motor and/or generator on the outside of the housing.

Figure 9:
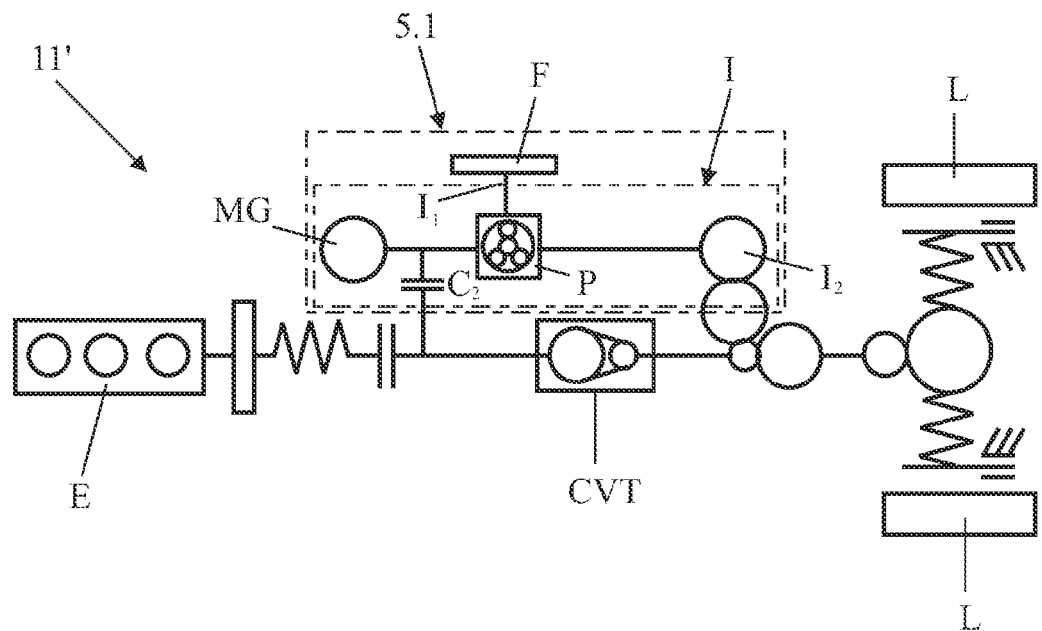
FIG. 9 shows the lay-out shown in FIG. 6 comprising connections to the primary side of the transmission.
Figure 10:
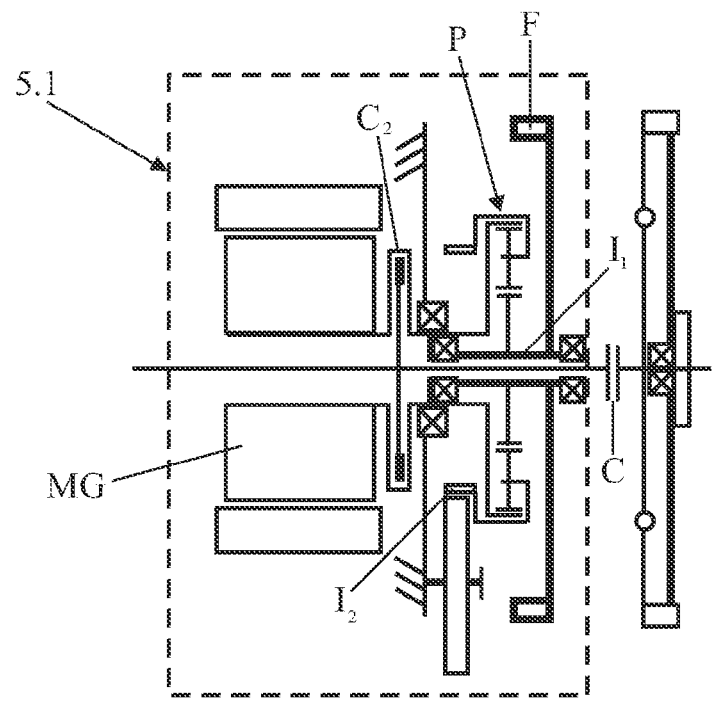
FIG. 10 gives a diagrammatic representation of a construction design of the flywheel module shown in FIG. 9.

FIG. 9 shows a lay-out 11' of the vehicle comprising additional connections from the flywheel module 5.1 to the primary side of the CVT and FIG. 10 again gives a diagrammatic representation of a construction design of this flywheel module. The flywheel module 5.1 is connected via a rotational member and further clutches $C_2$ to the primary side of the CVT in such a way that the planetary gear set P is parallel to the CVT.

Albeit the invention has been described in the foregoing with reference to the drawing Figures, it should be pointed out that the invention is not by any manner or means restricted to the embodiments shown in the drawing Figures. The invention also extends over any embodiments deviating from the embodiments shown in the drawing Figures within the spirit and scope defined by the claims.

We claim:

1. A flywheel module comprising:
   a flywheel; and
   a speed transforming device having a first in/output which is connected to the flywheel and a second in/output which is adapted to be coupled to a drive line of a vehicle positioned between a drive source and driven wheels, and/or to one or more of the driven wheels or further wheels of the vehicle and/or to the drive source of the vehicle, which speed transforming device can provide a continuously variable control of the torque between the first and the second in/output, wherein the speed transforming device comprises at least a single motor and/or generator, as well as a bypass speed transforming device having at least three rotational members, a first rotational member of which being connected to the first in/output, a second rotational member of which being connected to the second in/output and the third rotational member of which being connected to the motor and/or generator, where the flywheel module comprises energizing means for the motor and/or generator, as well as a control unit which can control the energizing means, the control unit being in a position to brake or drive the drive line and/or one or more of the driven wheels or further wheels by controlling the energizing means of the motor and/or generator; and
   a clutch which is positioned between one of the in/outputs and the rotational member connected thereto or between two of the rotational members.

2. The flywheel module as claimed in claim 1, wherein the energizing means comprise an energy storage system.

3. The flywheel module as claimed in claim 2, wherein the speed transforming device further comprises a further clutch which is positioned between the further motor and/or generator and the in/output connected thereto.

4. The flywheel module as claimed in claim 2, wherein the energizing means comprise a further motor and/or generator which is connected to one of the in/outputs or the drive line or one or more of the further wheels.

5. The flywheel module as claimed in claim 4, wherein the control unit comprises power electronics which allow for driving or decelerating with one of the motors and/or generators the other motor and/or generator.

6. The flywheel module as claimed in claim 4, wherein the drive source is the further motor and/or generator.

7. The flywheel module as claimed in claim 1, wherein the control unit controls the energizing means only for a period of time as a result of which the drive line and/or one or more of the further wheels is/are braked or driven only for a period of time.

8. The flywheel module as claimed in claim 1, wherein the speed transforming device further comprises a brake which is coupled to one of the rotational members.

9. The flywheel module as claimed in claim 1, wherein the speed transforming device further comprises a reduction gear which is positioned between on the one hand the bypass speed transforming device and on the other hand the motor and/or generator, or the flywheel or the second in/output or the clutch or the brake.

10. A vehicle comprising:
    two pairs of wheels;
    a transmission;
    a drive source which is connected to one of the wheel pairs via a drive line with the transmission being present in the drive line; and
    a flywheel module connected to the drive line between on the one hand the transmission and on the other hand the drive source or via the wheel pair connected to the transmission is connected to the drive line, and/or in that the flywheel module is connected to the other wheel pair, the flywheel module comprising:
    a flywheel; and
    a speed transforming device having a first in/output which is connected to the flywheel and a second in/output which is adapted to be coupled to the drive line for providing a continuously variable control of the torque between the first and the second in/output, wherein the speed transforming device comprises at least a single motor and/or generator, as well as a bypass speed transforming device having at least three rotational members, a first rotational member of which being connected to the first in/output, a second rotational member of which being connected to the second in/output and the third rotational member of which being connected to the motor and/or generator, where the flywheel module comprises energizing means for the motor and/or generator, as well as a control unit which can control the energizing means, the control unit being in a position to brake or drive the drive line and/or one or more of the driven wheels or further wheels by controlling the energizing means of the motor and/or generator, wherein the flywheel module is further coupled to the drive line on the other side of the transmission and wherein on this other side of the transmission a clutch is positioned between the drive line and the flywheel module, such that on this other side of the transmission the flywheel module is connected to the drive line only via this clutch.

11. A flywheel module comprising:
    a flywheel; and a speed transforming device having a first in/output which is connected to the flywheel and a second in/output which is adapted to be coupled to a drive line of a vehicle positioned between a drive source and driven wheels, and/or to one or more of the driven wheels or further wheels of the vehicle and/or to the drive source of the vehicle, which speed transforming device can provide a continuously variable control of the torque between the first and the second in/output, wherein the speed transforming device comprises at least a single motor and/or generator, as well as a bypass speed transforming device having at least three rotational members, a first rotational member of which being connected to the first in/output, a second rotational member of which being connected to the second in/output and the third rotational member of which being connected to the motor and/or generator, where the flywheel module comprises energizing means for the motor and/or generator, as well as a control unit which can control the energizing means, the control unit being in a position to brake or drive the drive line and/or one or more of the driven wheels or further wheels by controlling the energizing means of the motor and/or generator, wherein the energizing means comprise an energy storage system, wherein the speed transforming device further comprises a further clutch which is positioned between the further motor and/or generator and the in/output connected thereto.

* * * * *